(12) United States Patent
Nakayama et al.

(10) Patent No.: US 12,040,509 B2
(45) Date of Patent: Jul. 16, 2024

(54) SEALED BATTERY

(71) Applicant: Toyota Jidosha Kabushiki Kaisha, Toyota (JP)

(72) Inventors: Hiroyuki Nakayama, Okazaki (JP); Fumihiko Ishiguro, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 17/073,684

(22) Filed: Oct. 19, 2020

(65) Prior Publication Data
US 2021/0143387 A1 May 13, 2021

(30) Foreign Application Priority Data

Nov. 8, 2019 (JP) .................................. 2019-203138

(51) Int. Cl.
*H01M 50/552* (2021.01)
*H01M 50/528* (2021.01)
(Continued)

(52) U.S. Cl.
CPC ......... *H01M 50/561* (2021.01); *H01M 50/54* (2021.01); *H01M 50/553* (2021.01); *H01M 50/528* (2021.01)

(58) Field of Classification Search
CPC .. H01M 50/561; H01M 50/552; H01M 50/54; H01M 50/103; H01M 50/176;
(Continued)

(56) References Cited

U.S. PATENT DOCUMENTS

| | | | |
|---|---|---|---|
| 2011/0045345 A1* | 2/2011 | Tsuchiya | H01M 50/566 29/623.2 |
| 2014/0004408 A1* | 1/2014 | Ehara | H01M 50/176 29/623.2 |

(Continued)

FOREIGN PATENT DOCUMENTS

| | | | |
|---|---|---|---|
| CN | 105830253 A | | 8/2016 |
| CN | 108123188 A | * | 6/2018 |

(Continued)

OTHER PUBLICATIONS

Thermal Expansion-linear expansion coefficients, Engineering Toolbox, https://www.engineeringtoolbox.com/linear-expansion-coefficients-d_95.html (Year: 2003).*

(Continued)

*Primary Examiner* — Matthew T Martin
*Assistant Examiner* — Adam J Francis
(74) *Attorney, Agent, or Firm* — Dinsmore & Shohl LLP

(57) ABSTRACT

A sealed battery includes a case, an internal terminal, an external terminal, and an insulating holder. The internal terminal of the sealed battery includes a collector connected to an electrode body, a shaft part exposed outside the case, and a crimping part that is provided in an upper end portion of the shaft part. The crimping part is formed by pressurizing and deforming an upper end portion of the shaft part such that the crimping part extends along an upper surface of the external terminal. Then, the external terminal arranged outside the case is configured so that a linear expansion coefficient on a side of the upper surface and a linear expansion coefficient on a side of a bottom surface in contact with the insulating holder are different from each other.

9 Claims, 3 Drawing Sheets

(51) Int. Cl.
*H01M 50/54* (2021.01)
*H01M 50/553* (2021.01)

(58) Field of Classification Search
CPC .............. H01M 50/184; H01M 50/186; H01M 50/191; H01M 50/197; H01M 50/198; H01M 50/533; H01M 50/534; H01M 50/536; H01M 50/553; H01M 50/528; H01M 50/543; H01M 50/545; H01M 50/56; H01M 50/172
See application file for complete search history.

(56) References Cited

U.S. PATENT DOCUMENTS

| | | | | |
|---|---|---|---|---|
| 2014/0004409 | A1* | 1/2014 | Nakamura | H01M 50/566 429/179 |
| 2016/0254517 | A1* | 9/2016 | Tsunaki | H01M 50/528 429/179 |
| 2017/0117510 | A1* | 4/2017 | Takasu | B23K 26/26 |
| 2018/0097258 | A1* | 4/2018 | Ono | H01M 50/553 |
| 2019/0198850 | A1 | 6/2019 | Asakura et al. | |
| 2021/0036299 | A1* | 2/2021 | Maeda | H01M 50/553 |

FOREIGN PATENT DOCUMENTS

| | | | |
|---|---|---|---|
| JP | 5656592 | B2 | 9/2002 |
| JP | 2016-219380 | A | 12/2016 |
| JP | 2016207433 | A * | 12/2016 |
| JP | 2017-084585 | A | 5/2017 |
| JP | 2019-114501 | A | 7/2019 |
| WO | 2015/059826 | A1 | 4/2015 |
| WO | WO-2019151359 | A1 * | 8/2019 ............. H01G 11/74 |

OTHER PUBLICATIONS

English Translation of CN108123188 A—Battery for improving thermal conductance; Baoshan Iron and Steel; Jun. 5, 2018 (Year: 2018).*

English Translation of JP2016207433A—Square Secondary Battery; Hitachi Automotive Systems Ltd; Dec. 8, 2016 (Year: 2016).*

* cited by examiner

SEALED BATTERY

CROSS-REFERENCE TO RELATED APPLICATIONS

This application claims priority to Japanese Patent Application No. 2019-203138 filed on Nov. 8, 2019, which is incorporated herein by reference in its entirety including the specification, drawings and abstract.

BACKGROUND

1. Technical Field

The disclosure relates to a sealed battery.

2. Description of Related Art

Importance of a secondary battery such as a lithium-ion secondary battery and a nickel hydrogen battery as an on-vehicle power source, and a power source for a personal computer, a portable terminal, or the like has been increasing. The secondary battery is constructed as, for example, a sealed battery in which an electrode body is stored in a case in a sealed state. Normally, such a sealed battery includes a terminal structure that is used to electrically connect the electrode body inside the case to an external device (other battery, a motor, and so on) to each other.

Examples of the terminal structure of the sealed battery are disclosed in Japanese Unexamined Patent Application Publication No. 2016-219380 (JP 2016-219380 A) and Japanese Patent No. 5656592 (JP 5656592 B). For example, the battery terminal structure described in JP 2016-219380 A includes a lid member, an external terminal, an insulating member (an insulating holder), and an internal terminal. The lid member covers a case from above and has a first hole. The case stores a power generation element (an electrode body). The external terminal is provided above the lid member and has a second hole. The insulating member (the insulating holder) is provided between the lid member and the external terminal, insulates the lid member and the external terminal from each other, and has a third hole. The internal terminal electrically connects the external terminal and the power generation element to each other. Also, the internal terminal includes a shaft part and a crimping part. The shaft part goes through the first hole, the second hole, and the third hole. The crimping part is provided in an upper portion of the shaft part and crimps the external terminal. In this type of sealed battery, each member included in the terminal structure is pushed against the case (the lid body) when the crimping is performed, and is fixed in a pressurized state. Thus, the first hole of the lid member is sealed, and the case is thus sealed.

SUMMARY

In recent years, demands for safety and durability of a sealed battery have increased further, and it is desired to maintain high sealability of an inside of a case. The disclosure provides a technology by which sealability of an inside of a case is maintained.

A sealed battery according to an aspect of the disclosure includes an electrode body, a case that stores the electrode body, an internal terminal connected to the electrode body inside the case, a plate-shaped external terminal joined to the internal terminal outside the case, and an insulating holder arranged between the case and the external terminal. The internal terminal of the sealed battery includes a collector, a shaft part, and a crimping part. The collector is connected with the electrode body inside the case. The shaft part passes through the case, the insulating holder, and the external terminal, and is exposed outside the case. The crimping part is provided in an end portion of the shaft part outside the case. The crimping part is formed by pressurizing and deforming an upper end portion of the shaft part such that the crimping part extends along an upper surface of the external terminal. The external terminal arranged outside the case of the sealed battery disclosed here is configured so that a linear expansion coefficient on a side of the upper surface of the external terminal and a linear expansion coefficient on a side of a bottom surface that is in contact with the insulating holder are different from each other.

As a result of various examinations in order to maintain high sealability inside the case, the present inventors found that it is possible to restrain deterioration of sealability inside the case as long as melting of the insulating holder in manufacturing steps and at the time of charge and discharge is prevented. Specifically, there are instances where a large amount of heat is generated in a boundary between the crimping part of the internal terminal and the external terminal due to welding in the manufacturing steps and resistance heating at the time of charge and discharge. In this instance, once heat is transferred to the insulating holder arranged below the external terminal, a surface of the insulating holder slightly melts, and a thickness of the insulating holder may be reduced. In this case, pressure applied to members included in the terminal structure is released, and sealability inside the case may be deteriorated. On the contrary, in the sealed battery disclosed here, the external terminal is used in which the linear expansion coefficient on a side of the bottom surface and the linear expansion coefficient on a side of the upper surface are different from each other. The external terminal is curved and deformed when a large amount of heat is applied, and space may be formed between the external terminal and the insulating holder. Therefore, in the sealed battery disclosed here, transfer of a large amount of heat generated in the manufacturing steps and at the time of charge and discharge is restrained, and it is thus possible to prevent deterioration of sealability caused by melting of the insulating holder.

The external terminal may be configured so that the linear expansion coefficient on the side of the bottom surface is larger than the linear expansion coefficient on the side of the upper surface. Since thermal expansion is larger on the bottom surface side than the upper surface side, the external terminal may be curved and deformed into a depressed shape when a large amount of heat is generated. Therefore, an adequate amount of space is generated between the external terminal and the insulating holder, and it is possible to prevent, to a greater degree, deterioration of sealability caused by melting of the insulating holder.

The external terminal may be a plurality of metal layers laminated along an axis direction of the shaft part. With such an external terminal in which the metal layers are laminated, it is easy to have different linear expansion coefficients between the bottom surface side and the upper surface side.

Also, in the aspect of the external terminal having the metal layers, the external terminal may be two metal layers laminated along the axis direction of the shaft part, and the linear expansion coefficient of a second metal layer arranged on the side of the bottom surface may be larger than the linear expansion coefficient of a first metal layer arranged on the side of the upper surface. Thus, the external terminal is easily curved and deformed into the depressed shape when a large amount of heat is generated.

Also, in the aspect of the external terminal that has the two metal layers, the external terminal may be a positive electrode external terminal that is electrically connected to a positive electrode of the electrode body through the internal terminal. Also, the first metal layer may be made from aluminum (Al), and the second metal layer may be made from magnesium (Mg). Thus, when a large amount of heat is generated in the positive electrode external terminal, an adequate amount of space is easily generated between the external terminal and the insulating holder. Further, material cost is reduced for the positive electrode external terminal having the foregoing double-layer structure made from Al and Mg.

Further, in the aspect of the external terminal that has the two metal layers, the external terminal may be a negative electrode external terminal that is electrically connected to a negative electrode of the electrode body through the internal terminal. Also, the first metal layer may be made from copper (Cu), and the second metal layer may be made from aluminum (Al). Thus, when a large amount of heat is generated in the negative electrode external terminal, an adequate amount of space is easily generated between the external terminal and the insulating holder. Also, material cost is reduced for the negative electrode external terminal having the double-layer structure made from Cu and Al.

Furthermore, the sealed battery disclosed here is not limited to the aspects described above. For example, the external terminal may be configured so that the linear expansion coefficient on the side of the upper surface is larger than the linear expansion coefficient on the side of the bottom surface. When a large amount of heat is generated in the external terminal having the above configuration, there is larger thermal expansion on the side of the upper surface than that on the side of the bottom surface, and the external terminal is curved and deformed into a projecting shape. In this case, since space is generated between the external terminal and the insulating holder, it is possible to prevent deterioration of sealability caused by melting of the insulating holder.

Also, a welding mark may be formed across the crimping part of the internal terminal and the external terminal. As described above, in the manufacturing steps of the sealed battery, there are cases where the crimping part of the internal terminal and the external terminal are welded to each other. While the welding is a favorable treatment from a viewpoint of improvement of conductivity between the internal terminal and the external terminal, the welding can also cause deterioration of sealability due to melting of the insulating holder. Meanwhile, in the sealed battery disclosed here, the external terminal is curved and deformed during the welding, and transfer of a large amount of heat to the insulating holder is prevented. Therefore, the technology disclosed here exhibits especially favorable effects in the sealed battery in which the crimping part and the external terminal are welded to each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
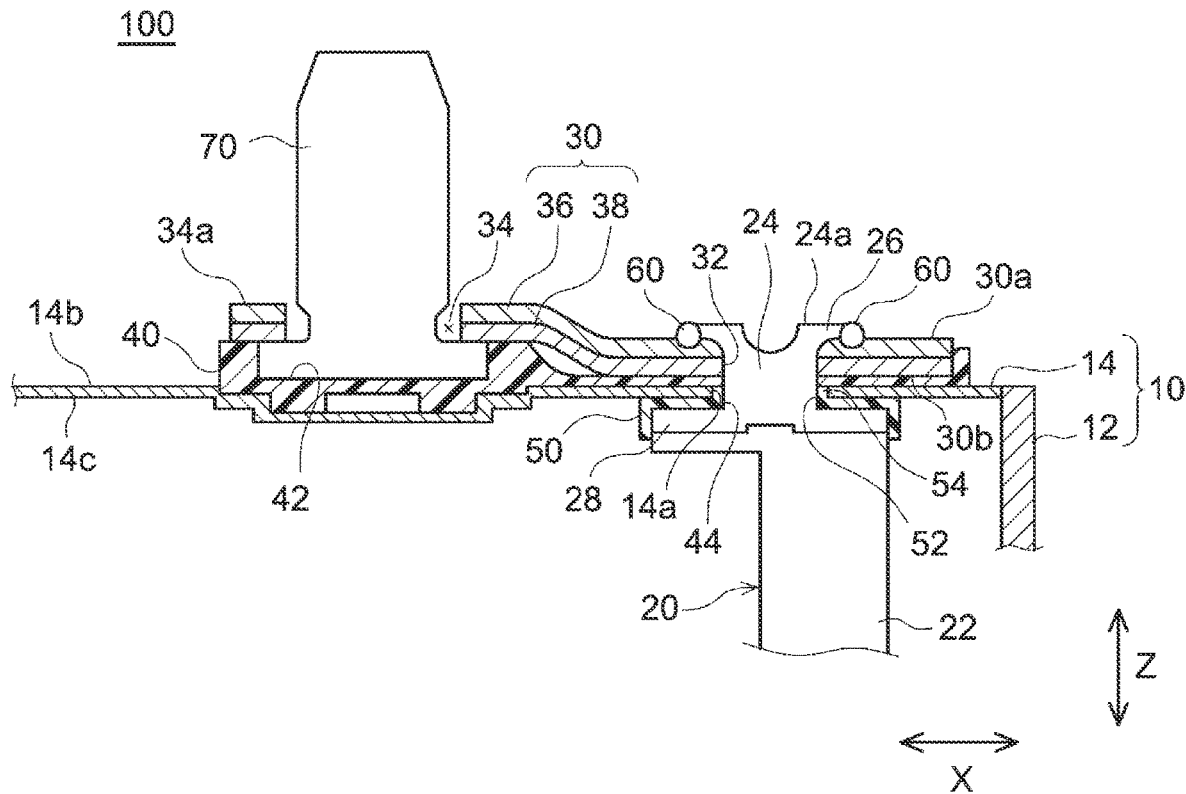
FIG. 1 is a sectional view schematically showing a terminal structure of a sealed battery according to a first embodiment of the disclosure.

Hereinafter, a sealed battery according to an embodiment of the disclosure is described with reference to the drawings. In the drawings described below, same reference numerals or characters are used to describe the members and portions that achieve the same effects. Dimensional relationships (lengths, widths, thicknesses, and so on) in each of the drawings do not reflect actual dimensional relationships. Also, matters that are necessary to carry out the disclosure other than the matters that are particularly described in this description (for example, general technologies and so on related to construction of a sealed battery, such as a configuration of or a manufacturing method for an electrode body and an electrolyte) can be understood as design matters for a person skilled in the art based on related arts in this field. In the embodiment, a lithium-ion secondary battery is described as an example of the sealed battery. However, the sealed battery disclosed here is not limited to a lithium-ion secondary battery and may be, for example, a nickel hydrogen battery.

First Embodiment

Figure 2:
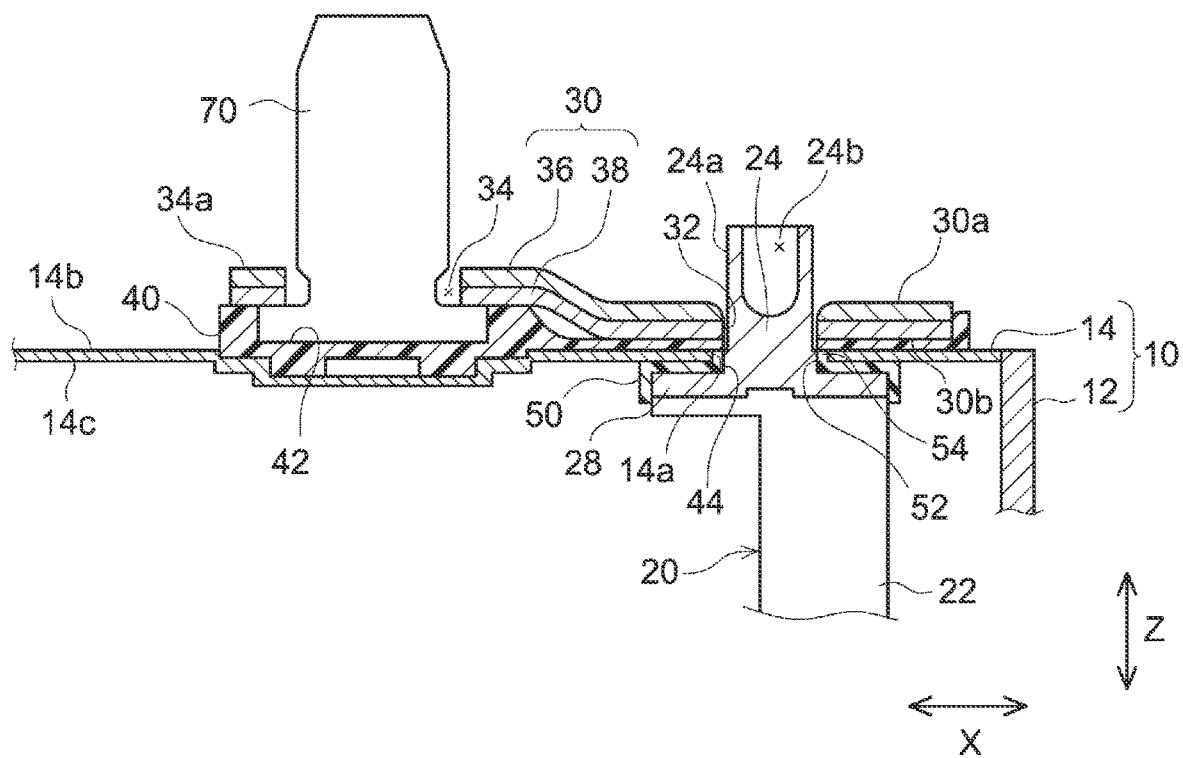
FIG. 2 is a sectional view schematically showing a state before a crimping step for the terminal structure of the sealed battery shown in FIG. 1.

FIG. 1 is a sectional view schematically showing a terminal structure of a sealed battery according to a first embodiment. FIG. 2 is a sectional view schematically showing a state before a crimping step for the terminal structure of the sealed battery shown in FIG. 1. A reference character X in each of the drawings represents a "width direction (of the sealed battery)", and a reference character Z represents a "height direction (of the sealed battery)". These directions are determined for convenience of description, and are not intended to limit directions in which the sealed battery disclosed herein is installed.

As shown in FIG. 1, a sealed battery 100 according to the embodiment includes a case 10, an internal terminal 20, an external terminal 30, and an insulating holder 40. Each of the members is described below.

(1) Case

The case 10 includes an angular case body 12 in which an upper surface is open, and a plate-shaped lid body 14 that closes the opening of the upper surface of the case body 12. In some embodiments, the case body 12 and the lid body 14 are made mainly from an inexpensive metal material with given strength such as an aluminum alloy. In the lid body 14, an opening 14a is formed in which a shaft part 24 of the internal terminal 20 is inserted.

Although not shown, an electrode body serving as a power generation element is stored inside the case 10. The electrode body includes a positive electrode and a negative electrode. Typically, the electrode body includes a positive electrode sheet, a negative electrode sheet, and an insulating separator. In the positive electrode sheet, a positive electrode mixture layer is applied onto a surface of a positive electrode collector foil. In the negative electrode sheet, a negative electrode mixture layer is applied onto a surface of a negative electrode collector foil. The insulating separator is interposed between the positive electrode sheet and the negative electrode sheet. Also, electrolyte such as nonaqueous electrolyte is also stored inside the case 10 although the electrolyte is not shown similarly to the electrode body. Materials similar to those for a conventional and general lithium-ion secondary battery may be used for the electrode body and the electrolyte without particular restriction, and detailed description of the materials is omitted as the materials do not characterize the technology disclosed herein.

(2) Internal Terminal

The internal terminal 20 is a conductive member connected with the electrode body (typically, the positive electrode collector foil or the negative electrode collector foil) inside the case 10. For the internal terminal 20, a metal material with given conductivity is used. In some embodiments, the metal material for the internal terminal 20 is selected appropriately with consideration of a material, conductivity, strength, material cost, and so on of a connecting object. For example, in some embodiments, the internal terminal 20 is made from the same type of metal material as that of the collector foil of the electrode body that is the connecting object. Thus, it is possible to connect the internal terminal 20 and the electrode body to each other with low resistance and high strength. In a general lithium-ion secondary battery, copper (Cu) or a copper alloy is used for a negative electrode collector foil. Therefore, in some embodiments, copper or a copper alloy be also used for the internal terminal 20 on the negative electrode side. Meanwhile, since aluminum (Al) or an aluminum alloy is used for the positive electrode collector foil, in some embodiments, aluminum or an aluminum alloy be also used for the internal terminal 20 on the positive electrode side.

Then, the internal terminal 20 according to the embodiment includes a collector 22, the shaft part 24, and a crimping part 26. The collector 22 is connected with the electrode body inside the case 10. Specifically, the collector 22 is a plate-shaped member that extends downward in the height direction Z (to the inside of the case 10). A lower end of the collector 22 is connected to the electrode body. Connected parts of the collector 22 and the electrode body are joined to each other by a conventionally known joining techniques, such as ultrasonic welding, laser welding, and resistance welding. Also, in the internal terminal 20 according to the embodiment, a flat plate-shaped base part 28 is provided in an upper end of the collector 22 and arranged so as to be almost parallel to the lid body 14.

The shaft part 24 is a portion that passes through the case 10, the insulating holder 40, and the external terminal 30, and is exposed outside the case 10. As shown in FIG. 2, the shaft part 24 before the crimping is a cylindrical member that is erected upward in the height direction Z (to the outside of the case 10) from the base part 28. In the cylindrical shaft part 24, an inner cavity 24b is formed so as to be depressed along an axial length direction (the height direction Z). The crimping is performed on an upper end portion 24a of the cylindrical shaft part 24 (that is an end portion of the cylindrical shaft part 24 outside the case 10), and the crimping part 26 shown in FIG. 1 is formed by pressurizing and deforming the upper end portion 24a of the shaft part 24. Specifically, a pressing jig is inserted into the inner cavity 24b of the shaft part 24 shown in FIG. 2, and the upper end portion 24a is pressurized and deformed so that a diameter of the inner cavity 24b expands. Thus, the crimping part 26 extending along an upper surface 30a of the external terminal 30 is formed in the upper end portion 24a of the shaft part 24 (see FIG. 1). By performing the crimping, the internal terminal 20 and the external terminal 30 are joined to teach other.

In the embodiment, in order to improve conductivity and joining strength between the internal terminal 20 and the external terminal 30, a boundary between the crimping part 26 and the external terminal 30 is welded. Thus, in the sealed battery 100 according to the embodiment, a welding mark 60 is formed so as to extend over the crimping part 26 of the internal terminal 20 and the external terminal 30. In order to weld the crimping part 26 and the external terminal 30 to each other, various welding techniques such as laser welding, resistance welding, and ultrasonic welding may be used without any specific restriction. Among these welding techniques, laser welding may be used in terms of precise welding that is performed easily.

(3) External Terminal

The external terminal 30 is a plate-shaped conductive member that is joined to the internal terminal 20 outside the case 10. As described earlier, the external terminal 30 is joined to the shaft part 24 (the crimping part 26) of the internal terminal 20, the shaft part 24 being deformed due to the crimping. The plate-shaped external terminal 30 is arranged so as to extend in the width direction X along an outer surface 14b of the lid body 14 (the case 10). Also, an internal terminal through-hole 32 is formed in a first end portion of the external terminal 30 in the width direction X. Also, a bolt through-hole 34 is formed in a second end portion of the external terminal 30 in the width direction X.

Then, the external terminal 30 in the embodiment is configured so that a linear expansion coefficient on a side of a bottom surface 30b in contact with the insulating holder 40 and a linear expansion coefficient on a side of the upper surface 30a of the external terminal 30 arranged outside the case 10 are different from each other. Specifically, the external terminal 30 according to the embodiment has a double-layer structure in which two metal layers are laminated along the axis direction (that is the height direction Z) of the shaft part 24. This means that, the external terminal 30 includes a first metal layer 36 positioned on the side of the upper surface 30a, and a second metal layer 38 positioned on the side of the bottom surface 30b. Then, the first metal layer 36 and the second metal layer 38 are made from different metal materials, respectively, and have different linear expansion coefficients from each other. Since the external terminal 30 having the double-layer structure is used, the linear expansion coefficient of the external terminal 30 on the side of the upper surface 30a, and the linear expansion coefficient of the external terminal 30 on the side of the bottom surface 30b are different from each other in the sealed battery 100 according to the embodiment.

Further, in the embodiment, the external terminal 30 is configured so that the linear expansion coefficient on the side of the bottom surface 30b is larger than the linear expansion coefficient on the side of the upper surface 30a. This means that metal materials used to construct the layers, respectively, are selected so that the linear expansion coefficient of the second metal layer 38 on the side of the bottom surface 30b is larger than the linear expansion coefficient of the first metal layer 36 on the side of the upper surface 30a. The metal materials used for the first metal layer 36 and the second metal layer 38 are described later.

(4) Insulating Holder

The insulating holder 40 is an insulating member that prevents electric conduction between the above-mentioned conductive terminal (the internal terminal 20 and the external terminal 30), and the case 10 (the lid body 14). The insulating holder 40 is arranged between the outer surface 14b of the lid body 14 (the case 10) and the external terminal 30. In the insulating holder 40, a bolt storage part 42 and a first through-hole 44 are formed. In the bolt storage part 42, a lower end portion of a bolt 70 is stored. The shaft part 24 of the internal terminal 20 is inserted into the first through-hole 44. A resin material that can be used for this type of insulating member may be used for the insulating holder 40 without any specific restriction. The resin material may be, for example, insulating resin such as polyamide resin, polyacetal resin, polyimide resin, and so on.

Further, a region around the first through-hole 44 of the insulating holder 40 is fixed in a state of being sandwiched between the crimping part 26 of the internal terminal 20 and the lid body 14 by the crimping described earlier. Due to pressure given at that time, the insulating holder 40 is elastically deformed and comes into close contact with the crimping part of the internal terminal 20 and the lid body 14.

(5) Other Members

The sealed battery 100 according to the embodiment includes a gasket 50 and the bolt 70 other than the foregoing members, although they are not intended to limit the technology disclosed herein.

The gasket 50 is an insulating elastic member arranged between an inner surface 14c of the lid body 14 and the base part 28 of the internal terminal 20. The gasket 50 is provided in order to prevent an electric conduction between the internal terminal 20 and the lid body 14 (the case 10). Also, the gasket 50 that is an elastic member is sandwiched between the crimping part 26 of the internal terminal 20 and the base part 28 in a pressurized state. Thus, the gasket 50 is fixed in an elastically-deformed state, and pressure applied to other members (the external terminal 30, the insulating holder 40, and the lid body 14) sandwiched between the crimping part 26 and the base part 28 is maintained. As described above, the gasket 50 also has a function of adequately sealing the opening 14a of the lid body 14 so as to contribute to restraint of deterioration of sealability. The gasket 50 has a second through-hole 52 and a cylindrical projection 54. The shaft part 24 of the internal terminal 20 is inserted into the second through-hole 52, and the cylindrical projection 54 is formed around the second through-hole 52. The projection 54 is inserted into the opening 14a of the lid body 14 and crimped onto a bottom surface of the insulating holder 40. In some embodiments, the gasket 50 is made from, for example, PFA, PP, EPDM, and fluororubber.

The bolt 70 is a columnar metallic member erected along the height direction Z, and is arranged outside the case 10 (typically, above the insulating holder 40). Specifically, the lower end portion of the bolt 70 is stored in the bolt storage part 42 of the insulating holder 40. Then, the bolt 70 is inserted into the bolt through-hole 34 of the external terminal 30. A screw groove (not shown) is formed in an outer peripheral surface of the bolt 70. In the sealed battery 100, a connecting member (a bus bar) connected with the external device is arranged above a peripheral edge part 34a of the bolt through-hole 34 of the external terminal 30, and the bus bar and the external terminal 30 is connected to each other easily and firmly as a nut is fastened to the bolt 70.

(6) Effect of Maintaining Sealability

As described earlier, in the sealed battery 100 according to the embodiment, the external terminal 30 having the double-layer structure including the first metal layer 36 and the second metal layer 38 is used. The metal materials for the respective layers are selected so that the linear expansion coefficient is larger in the second metal layer 38 on the side of the bottom surface 30b than that of the first metal layer 36 on the side of the upper surface 30a. Thus, it is possible to prevent deterioration of sealability inside the case 10 when a large amount of heat is generated in the external terminal 30 at the time of welding, or charge and discharge, and maintain high sealability. Hereinafter, an effect of maintaining sealability according to the embodiment is described specifically with use of an example case in which laser welding is performed.

Figure 3:
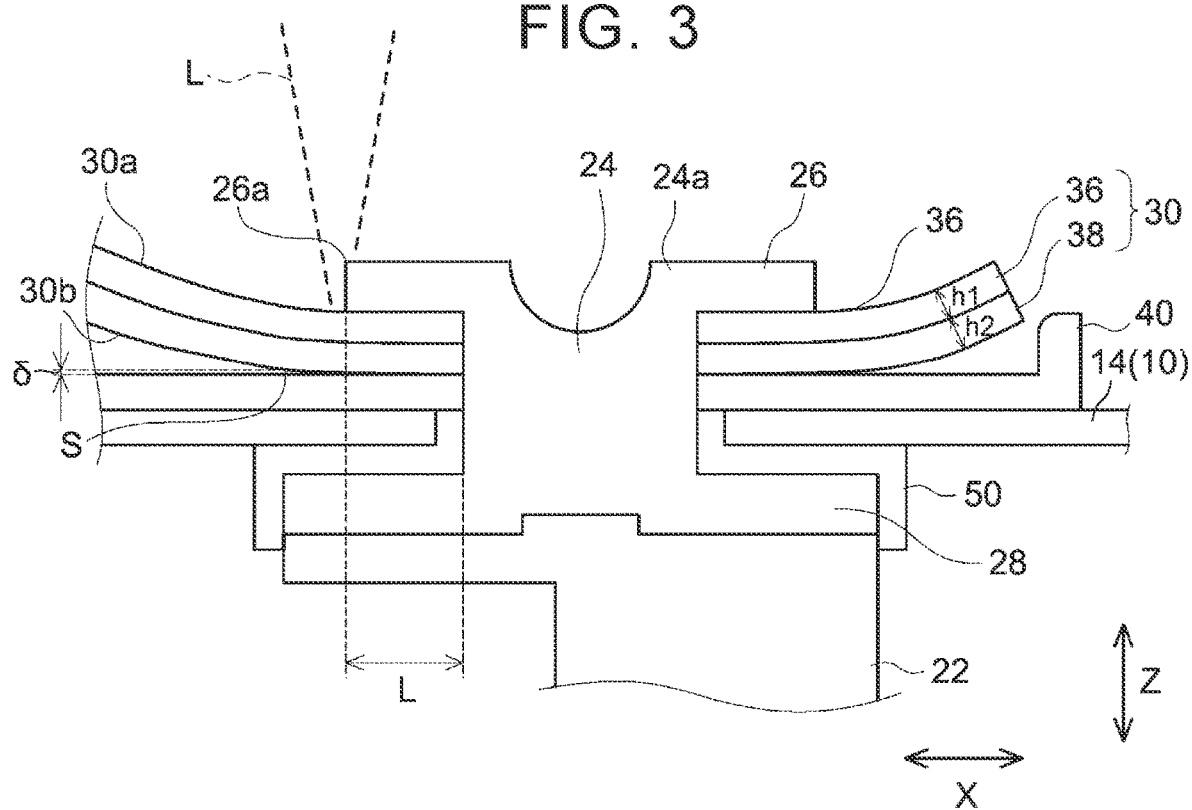
FIG. 3 is a sectional view schematically showing a state in which a crimping part of an internal terminal and an external terminal are welded to each other by laser in the sealed battery according to the first embodiment of the disclosure.

FIG. 3 is a sectional view schematically showing a state in which the crimping part of the internal terminal and the external terminal are welded to each other by laser in the sealed battery according to the first embodiment. As described above, in the embodiment, from a viewpoint of stabilization of conductivity between the internal terminal 20 and the external terminal 30, laser welding is performed on a boundary between the crimping part 26 and the external terminal 30. Once heat of laser L at the time of the welding is transferred to the insulating holder 40 through the external terminal 30, the insulating holder 40 melts and a thickness thereof can be reduced. In a general sealed battery 100, pressure applied to other members sandwiched between a crimping part 26 and a base part 28 is maintained by an insulating holder 40 after crimping, and deterioration of sealability inside a case 10 is restrained. However, once the thickness of the insulating holder 40 is reduced due to the melting, pressure applied to the other members (for example, a gasket 50) is released and elastic deformation is eliminated, and space may be made between an inner surface 14c of a lid body 14 and a base part 28. This may cause deterioration of sealability. However, in the embodiment, the external terminal 30 is used in which the linear expansion coefficient on the side of the bottom surface 30b is larger than that on the side of the upper surface 30a. Since the thermal expansion on the side of the bottom surface 30b is larger than that on the side of the upper surface 30a in the external terminal 30, the external terminal 30 is curved and deformed into a depressed shape when a large amount of heat is applied to the external terminal 30, and space S is formed between the external terminal 30 and the insulating holder 40. Then, air heat insulation is formed by the space S, and transfer of heat to the insulating holder 40 is blocked. Therefore, according to the embodiment, even when a large amount of heat is generated in the external terminal 30, deterioration of sealability due to melting of the insulating holder 40 is prevented.

Further, when the external terminal 30 is curved and deformed into the depressed shape, vertical drag is generated in a region in which the crimping part 26, the external terminal 30, the insulating holder 40, and the lid body 14 are laminated. Thus, pressure applied to the insulating holder 40 is increased, and the other members such as the gasket 50 are compressed further. Thus, adhesiveness between the inner surface 14c of the lid body 14 and the base part 28 is improved. The external terminal 30 is curved and deformed not only when the welding described above is performed, but also due to resistance heating of the external terminal 30 at the time of charge and discharge. This means that, in the sealed battery 100 according to the embodiment, the external terminal 30 is curved and deformed while the sealed battery 100 is used (charged and discharged), and adhesiveness between the insulating holder 40 and the shaft part 24 is thus improved. Therefore, the sealed battery 100 according to the embodiment is used especially suitably as a power source for a moving body (for example, a vehicle and so on) in which sealability may be deteriorated due to assembly misalignment caused by vibration while the moving body is used.

In the sealed battery 100 according to the embodiment, a deformation amount δ of the external terminal 30 at the time of heating may be 1 μm or larger, or may be 1.4 μm or larger. As described above, since the external terminal 30 is used in which the space S is made sufficiently between the external terminal 30 and the insulating holder 40 when the external terminal 30 is curved, it is possible to more suitably prevent deterioration of sealability caused by melting of the insulating holder 40. Further, in terms of preventing deterioration of sealability caused by melting of the insulating holder 40, an upper limit of the deformation amount δ at the time of heating is not particularly limited, and may be 10 μm or smaller. However, when a difference between the linear expansion coefficient on the side of the upper surface 30a and the linear expansion coefficient on the side of the bottom surface 30b is too large, deterioration such as cracks may happen inside the external terminal 30 due to internal stress. From this viewpoint, the upper limit of the deformation amount δ at the time of heating may be 6 μm or smaller, or 5.6 μm or smaller.

The "deformation amount δ at the time of heating" described above indicates the space S between the external terminal 30 and the insulating holder 40, the space S being formed below the outer peripheral edge 26a of the crimping part 26 when temperature of the external terminal 30 is increased by 150° C. For example, when the external terminal 30 is used in which a thickness h1 of the first metal layer 36 and a thickness h2 of the second metal layer 38 are the same, the deformation amount δ at the time of heating may be calculated based on the equation (1) below:

$$\delta = L^2 \times (\alpha 2 - \alpha 1) \times T \div h1 \times 6 \times E1 \times E2 \div ((E1+E2)^2 + (12 \times E1 \times E2)) \quad (1)$$

δ: Deformation amount (μm) when there is a temperature change of 150° C.
L: Width dimension (mm) in a region in which the crimping part and the external terminal overlap each other
α1: Linear expansion coefficient ($10^{-6}$/K) of the first metal layer
α2: Linear expansion coefficient ($10^{-6}$/K) of the second metal layer
T: Temperature change amount (=150° C.)
E1: Young's modulus (MPa) of the metal layer positioned on the upper surface side
E2: Young's modulus (MPa) of the metal layer positioned on the bottom surface side
h1: Thickness of the first metal layer (=thickness of the second metal layer).

Also, as described above, in the sealed battery 100 according to the embodiment, metal materials that configure the respective layers are selected so that the linear expansion coefficient of the second metal layer 38 arranged on the side of the bottom surface 30b is larger than that of the first metal layer 36 arranged on the side of the upper surface 30a.

Also, as described above, in the general sealed battery 100, Al is used for the internal terminal 20 on the positive electrode side. Therefore, in some embodiments, Al (linear expansion coefficient: $24 \times 10^{-6} \cdot K^{-1}$) that is also used for the internal terminal 20 is used for the first metal layer 36 that is in contact with the crimping part 26 of the internal terminal 20. In this case, a metal material having a linear expansion coefficient larger than that of Al is used for the second metal layer 38. Thus, it is possible to form the external terminal 30 that is curved and deformed into the depressed shape when a large amount of heat is generated. From this viewpoint, for the second metal layer 38 on the positive electrode side, for example, Mg (linear expansion coefficient: $26 \times 10^{-6} \cdot K^{-1}$), Pb (linear expansion coefficient: $29.3 \times 10^{-6} \cdot K^{-1}$), or Zn (linear expansion coefficient: $39.7 \times 10^{-6} \cdot K^{-1}$) can be used. When Mg is used for the second metal layer 38 out of these metal materials, it is possible to form the external terminal 30 that is curved so that an adequate amount of space is made between the external terminal 30 and the insulating holder 40. Also, since Mg is a relatively inexpensive material, Mg may be used in terms of material cost.

Further, the metal materials used for the first metal layer 36 and the second metal layer 38, respectively, may be alloys. For example, Al alloys such as JIS-AC2A (linear expansion coefficient: $21.5 \times 10^{-6} \cdot K^{-1}$), JIS-AC3A (linear expansion coefficient: $20.5 \times 10^{-6} \cdot K^{-1}$), and JIS-AC4A (linear expansion coefficient: $21 \times 10^{-6} \cdot K^{-1}$) may be used for the first metal layer 36. When the Al alloy is used for the first metal layer 36, Al and Sn (linear expansion coefficient: $23 \times 10^{-6} \cdot K^{-1}$) may be used for the second metal layer 38. Also, aluminum alloys having different linear expansion coefficients may be used for the first metal layer 36 and the second metal layer 38, respectively.

Meanwhile, as described earlier, in the general sealed battery 100, Cu is used for the internal terminal 20 on the negative electrode side. Therefore, in some embodiments, Cu (linear expansion coefficient: $17.1 \times 10^{-6} \cdot K^{-1}$) that is also used for the internal terminal 20 is used for the first metal layer 36 that is in contact with the crimping part 26 of the internal terminal 20. In this case, Al, Mg, Pb, Zn, silver (Ag, linear expansion coefficient: $19.7 \times 10^{-6} \cdot K^{-1}$), or the like may be used for the second metal layer 38 on the negative electrode side. Among them, Al and Mg may be used from a viewpoint of obtaining the external terminal that is curved appropriately at low cost. Further, similarly to the external terminal on the positive electrode, an alloy may be used for the external terminal on the negative electrode side.

Other Embodiments

The embodiment of the sealed battery disclosed here has been described so far. However, the disclosure is not limited to the first embodiment, and various structures may be changed.

(1) Second Embodiment

Figure 4:
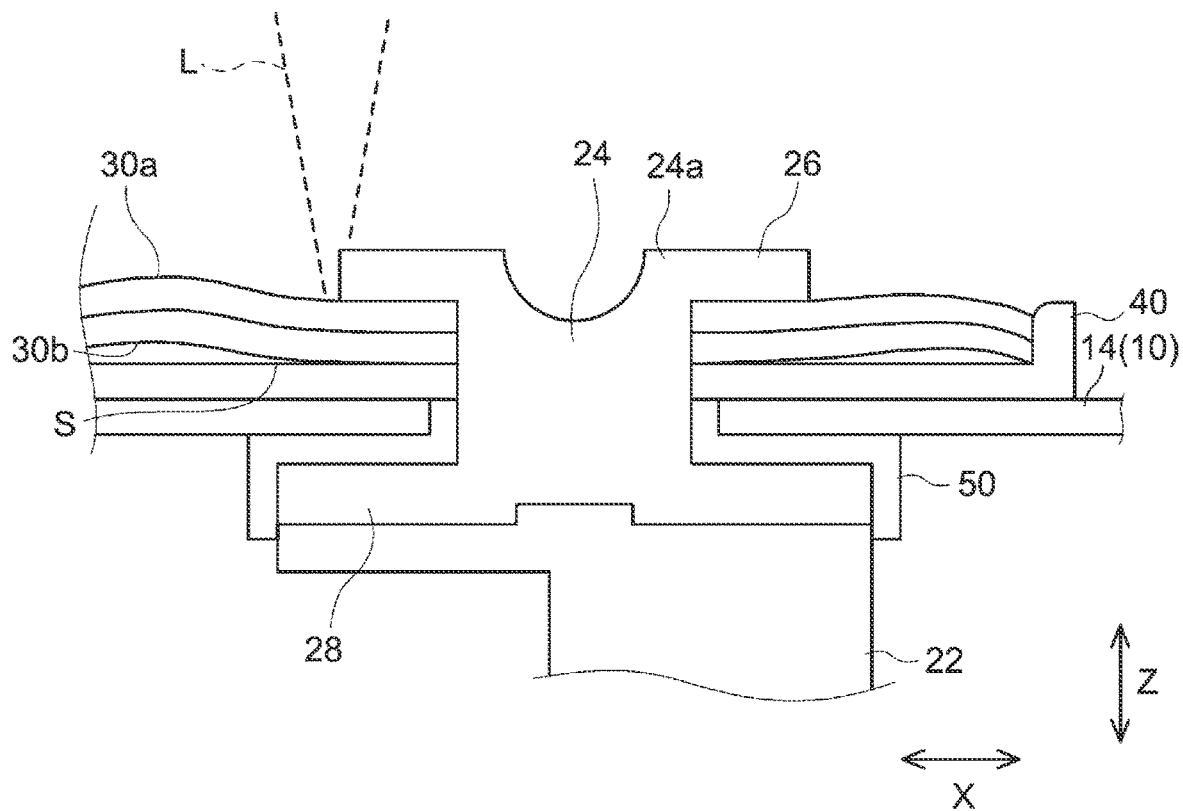
FIG. 4 is a sectional view schematically showing a state in which a crimping part of an internal terminal and an external terminal are welded to each other by laser in a sealed battery according to a second embodiment of the disclosure.

For example, in the first embodiment, the external terminal 30 in which the linear expansion coefficient on the bottom surface 30b side is larger than the linear expansion coefficient on the upper surface 30a side is used, and the external terminal 30 is curved and deformed into a depressed shape when a large amount of heat is generated. However, in the sealed battery disclosed here, it is only necessary that the linear expansion coefficient on the side of the bottom surface of the external terminal is different form the linear expansion coefficient on the side of the upper surface, and the sealed battery disclosed here is not limited to the foregoing first embodiment. Specifically, the external terminal 30 may be used in which the linear expansion coefficient on the bottom surface 30b side is smaller than the linear expansion coefficient on the upper surface 30a side (see FIG. 4). When a large amount of heat is generated in the external terminal 30, the external terminal 30 on both sides of the crimping part 26 of the internal terminal 20 is curved into a projecting shape. In this case, space S is also formed between the external terminal 30 and the insulating holder 40, and it is thus possible to prevent deterioration of sealability due to melting of the insulating holder 40. In the case where the external terminal 30 that is curved and deformed into the projecting shape as shown in FIG. 4 is formed, the external terminal 30 having the double-layer structure including the first metal layer 36 and the second metal layer 38 is used, and a metal material with a smaller linear expansion coefficient than that of a metal material for the first metal layer 36 is used for the second metal layer 38.

(2) Third Embodiment

Figure 5:
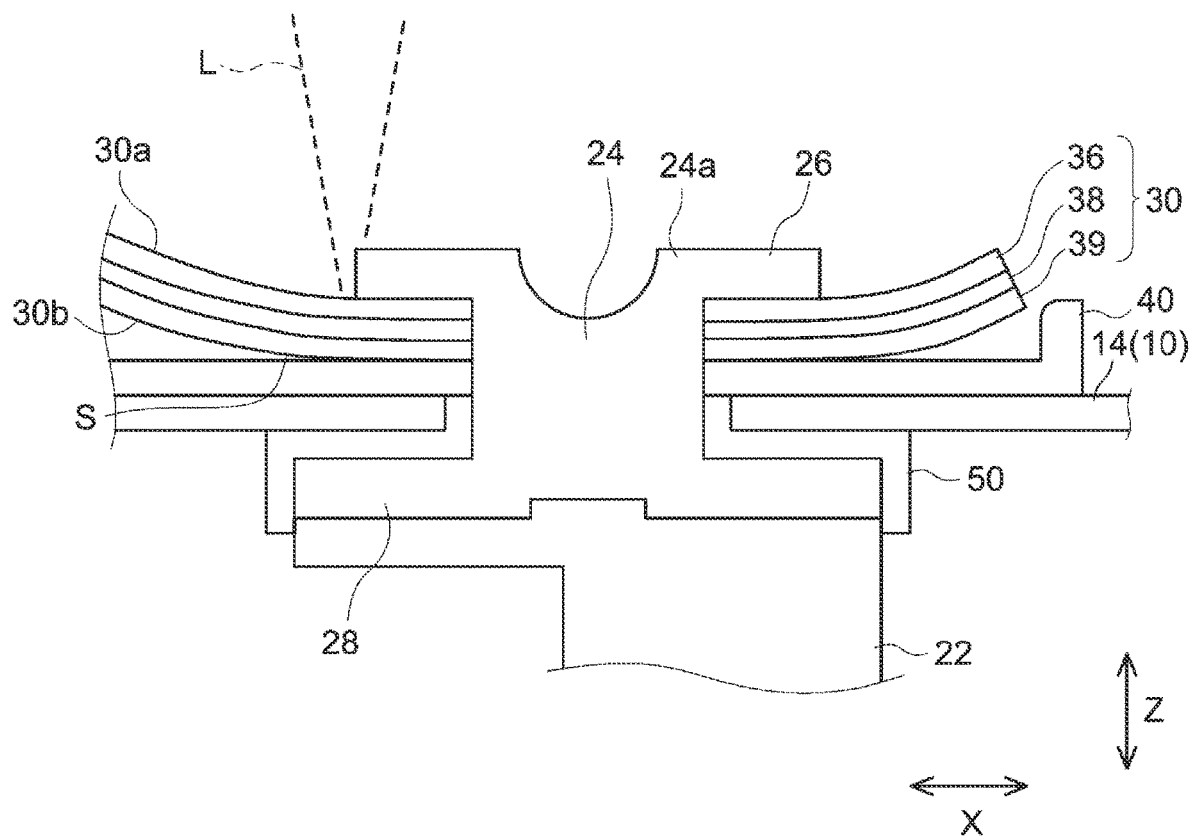
FIG. 5 is a sectional view schematically showing a state in which a crimping part of an internal terminal and an external terminal are welded to each other by laser in a sealed battery according to a third embodiment of the disclosure.

Also, in the foregoing first and second embodiments, the external terminal 30 having the double-layer structure including the first metal layer 36 and the second metal layer 38 is used. However, in the sealed battery disclosed herein, the number of metal layers included in the external terminal is not particularly limited. For example, as shown in FIG. 5, the external terminal 30 having a three-layer structure including the first metal layer 36, the second metal layer 38, and a third metal layer 39 may be used. Also in the external terminal 30 having the three-layer structure, the linear expansion coefficient on the bottom surface 30b side, and the linear expansion coefficient on the upper surface 30a side are different from each other. Thus, it is possible to generate appropriate curve and deformation when the external terminal 30 is heated. When this type of external terminal having three or more metal layers is used, the linear expansion coefficients of all of the metal layers may not necessarily be different from each other. This means that, as a whole, as long as the linear expansion coefficients on the upper surface side and the bottom surface side are different from each other, it is possible to obtain the external terminal that is curved and deformed when the external terminal is heated. For example, in the external terminal 30 having the three-layer structure shown in FIG. 5, the linear expansion coefficients of the first metal layer 36 and the second metal layer 38 are almost the same, and, even when the linear expansion coefficient of the third metal layer 39 and the linear expansion coefficient of the first metal layer 36 (and the second metal layer 38) are different form each other, it is possible to make the external terminal appropriately curved and deformed. When the external terminal having three or more metal layers is used, the linear expansion coefficients of the metal layers may be changed in stages so that the linear expansion coefficient increases (or decreases) sequentially from the upper surface side to the bottom surface side of the external terminal. Thus, it is possible to restrain stress caused by curving and deformation from concentrating on interfaces of the metal layers and causing deterioration of the external terminal such as cracks.

(3) Fourth Embodiment

In the first embodiment, since the crimping part 26 of the internal terminal 20 and the external terminal 30 are welded to each other, the welding mark 60 is formed across the crimping part 26 and the external terminal 30. However, the effect of maintaining sealability obtained by the technology disclosed herein is also obtained in a situation other than the welding described above. This means that the technology disclosed here is not limited to a form of welding of the crimping part and the external terminal. Specifically, the temperature of the external terminal may be increased to high temperature (about 150° C.) due to resistance heating at the time of charge and discharge, and deterioration of sealability may happen due to melting of the insulating holder. With the sealed battery disclosed herein, even when temperature of the external terminal is increased by the resistance heating, the external terminal is curved, and transfer of heat of the external terminal to the insulating holder is thus prevented.

TEST EXAMPLES

Hereinafter, test examples related to the disclosure are described. The test examples described below are not intended to limit the disclosure.

1. Construction of a Battery for Testing

In this test, the sealed battery 100 having the terminal structure shown in FIG. 1 was constructed. Specifically, first of all, the gasket 50 was arranged on the inner surface 14c of the lid body 14, the insulating holder 40 was arranged in the outer surface 14b, and a periphery of the opening 14a was pressed such that the gasket 50 and the insulating holder 40 were sandwiched. Thus, temporarily fastening was done (see FIG. 2). Then, after the bolt 70 was arranged in the bolt storage part 42 of the insulating holder 40, the external terminal 30 was arranged on the upper surface of the insulating holder 40 while the bolt 70 was being inserted into the bolt through-hole 34. Then, the shaft part 24 of the internal terminal 20 was inserted into a hole that was made as the internal terminal through-hole 32 of the external terminal 30, the opening 14a of the lid body 14, the first through-hole 44 of the insulating holder 40, and the second through-hole 52 of the gasket 50 were laminated to each other, and then the upper end portion 24a of the shaft part 24 was exposed above the lid body 14. Then, the base part 28 of the internal terminal 20 was pressed from below the lid body 14 using a pressing jig, and the upper end portion 24a of the shaft part 24 was pressed from above the lid body 14. At this time, the upper end portion 24a of the shaft part 24 was pressed and deformed so that a diameter of the inner cavity 24b of the cylindrical shaft part 24 expands, and the crimping part 26 was thus formed (see FIG. 1). Thereafter, the lid body 14 and the case body 12 were combined with each other so that a lower end of the collector 22 of the internal terminal 20 was connected to the electrode body, and the electrode body was stored inside the case body 12. Then, the sealed battery 100 was configured as electrolyte was injected from a liquid injection port (not shown) and then the liquid injection port was sealed.

2. Description of Samples

In this test, six of the sealed batteries 100 (samples 1 to 6) were prepared, and different external terminals were used for the samples, respectively. The external terminals used for the samples, respectively, are described below.

(1) Sample 1

The external terminal 30 having the double-layer structure was fabricated in which Al was used for the first metal layer 36 (thickness: 0.75 mm) arranged on the side of the upper surface 30a, and Mg was used for the second metal layer 38 (thickness: 0.75 mm) arranged on the side of the bottom surface 30b. Then, in the sample 1, the external terminal 30 in which Al and Mg were laminated was used as the external terminal on the positive electrode side.

(2) Sample 2

The external terminal 30 having the double-layer structure was fabricated in which Cu was used for the first metal layer 36 arranged on the side of the upper surface 30a, and Al was used for the second metal layer 38 arranged on the side of the bottom surface 30b. In the sample 2, the external terminal 30 in which Cu and Al were laminated was used as the external terminal on the negative electrode side.

(3) Sample 3

The external terminal 30 having the double-layer structure was fabricated in which gold (Au) was used for the first metal layer 36 arranged on the side of the upper surface 30a, and Cu was used for the second metal layer 38 arranged on the side of the bottom surface 30b. In the sample 3, the external terminal 30 in which Au and Cu were laminated was used as the external terminal on the negative electrode side.

(4) Sample 4

The external terminal 30 having the double-layer structure was fabricated in which nickel (Ni) was used for the first metal layer 36 arranged on the side of the upper surface 30a, and Cu was used for the second metal layer 38 arranged on the side of the bottom surface 30b. In the sample 4, the external terminal 30 in which Ni and Cu were laminated was used as the external terminal on the negative electrode side.

(5) Sample 5

The external terminal 30 having the double-layer structure was fabricated in which platinum (Pt) was used for the first metal layer 36 arranged on the side of the upper surface 30a, and Cu was used for the second metal layer 38 arranged on the side of the bottom surface 30b. In the sample 5, the external terminal 30 in which Pt and Cu were laminated was used as the external terminal on the negative electrode side.

(6) Sample 6

In this sample, the external terminal 30 having the double-layer structure was fabricated in which Cu was used for both the first metal layer 36 and the second metal layer 38, and was used as the external terminal on the negative electrode side.

3. Evaluation Testing

The boundary between the crimping part 26 and the external terminal 30 in the each of the sealed battery samples was irradiated with laser, and the external terminals 30 were heated to 150° C. Then, each of the external terminals 30 was observed, and a deformation amount (a warp amount) δ (μm) of the external terminal 30 in a lower part of a laser irradiation position (the outer peripheral edge 26a of the crimping part 26) was measured. Further, each of the sealed batteries 100 was disassembled after the laser irradiation, and observed to see whether there was any melting on the upper surface of the insulating holder 40. Table 1 shows observation results of the deformation amount δ (μm) and the melting of the external terminal 30.

As shown in Table 1, in the samples 1 to 5, it was confirmed that the external terminals were curved and deformed while the samples were heated, and spaces were made between the insulating holders, and the external terminals, respectively. Then, in the samples 1 to 5, melting of the insulating holder was restrained. From these results, it was found that, as the linear expansion coefficient of the external terminal on the upper surface side and the linear expansion coefficient of the external terminal on the bottom surface side were different from each other, the external terminal was curved and deformed when a large amount of heat was applied to the external terminal, and it is thus possible to prevent deterioration of sealability caused by melting of the insulating holder.

Specific examples of the disclosure have been described in detail. However, the disclosure includes various deformation and changes of the specific examples described so far.

What is claimed is:

1. A sealed battery comprising:
an electrode body;
a case that stores the electrode body;
an internal terminal connected to the electrode body inside the case;
a plate-shaped external terminal joined to the internal terminal outside the case; and
an insulating holder arranged between the case and the external terminal,
wherein:
the internal terminal includes:
a collector connected with the electrode body inside the case;
a shaft part that passes through the case, the insulating holder, and the external terminal and is exposed outside the case; and
a crimping part that is provided in an end portion of the shaft part outside the case, the crimping part being formed by pressurizing and deforming an upper end portion of the shaft part such that the crimping part extends along an upper surface of the external terminal; and
the external terminal arranged outside the case is configured so that a linear expansion coefficient on a side of the upper surface of the external terminal and a linear expansion coefficient on a side of a bottom surface that is in contact with the insulating holder are different from each other,
wherein the external terminal is curved so at least a portion of the external terminal and the insulating holder are spaced apart by a deformation amount of the

TABLE 1

| | | | | Internal Terminal Material | External Terminal | | | | | | | | |
|---|---|---|---|---|---|---|---|---|---|---|---|---|---|
| | | | | | First Metal Layer | | | | Second Metal Layer | | | | |
| | L (mm) | T (° C.) | Polarity | | Material | α ($10^{-6} \cdot K^{-1}$) | E (GPa) | h (mm) | Material | α ($10^{-6} \cdot K^{-1}$) | E (GPa) | h (mm) | δ (μm) | Melting |
| Sample 1 | 3 | 150 | Positive Electrode | Al | Al | 24 | 71 | 0.75 | Mg | 26 | 45 | 0.75 | 1.4 | Not observed |
| Sample 2 | | | Negative Electrode | Cu | Cu | 17.1 | 128 | 0.75 | Al | 24 | 71 | 0.75 | 4.5 | Not observed |
| Sample 3 | | | | | Au | 14.2 | 79 | 0.75 | Cu | 17.1 | 128 | 0.75 | 1.9 | Not observed |
| Sample 4 | | | | | Ni | 13.4 | 200 | 0.75 | Cu | 17.1 | 128 | 0.75 | 2.5 | Not observed |
| Sample 5 | | | | | Pt | 8.8 | 168 | 0.75 | Cu | 17.1 | 128 | 0.75 | 5.6 | Not observed |
| Sample 6 | | | | | Cu | 17.1 | 128 | 0.75 | Cu | 17.1 | 128 | 0.75 | 0 | Observed | external terminal at a time of heating and the deformation amount of the external terminal is 1 μm or larger;
wherein a welding mark is formed across the crimping part of the internal terminal and the external terminal;
wherein the insulating holder comprises one or more of polyamide resin, polyacetal resin, and polyimide resin; and
wherein the external terminal comprises a first metal layer, a second metal layer, and a third metal layer.

2. The sealed battery according to claim 1, wherein the external terminal is configured so that the linear expansion coefficient on the side of the bottom surface is larger than the linear expansion coefficient on the side of the upper surface.

3. The sealed battery according to claim 2, wherein the first metal layer, the second metal layer, and the third metal layer are laminated along an axis direction of the shaft part.

4. The sealed battery according to claim 3, wherein:
the linear expansion coefficient of third metal layer arranged on the side of the bottom surface is larger than the linear expansion coefficient of the first metal layer arranged on the side of the upper surface.

5. The sealed battery according to claim 4, wherein:
the external terminal is a positive electrode external terminal that is electrically connected to a positive electrode of the electrode body through the internal terminal; and
the first metal layer is made from aluminum, and the second metal layer is made from magnesium.

6. The sealed battery according to claim 4, wherein:
the external terminal is a negative electrode external terminal that is electrically connected to a negative electrode of the electrode body through the internal terminal; and
the first metal layer is made from copper, and the second metal layer is made from aluminum.

7. The sealed battery according to claim 1, wherein the external terminal is configured so that the linear expansion coefficient on the side of the upper surface is larger than the linear expansion coefficient on the side of the bottom surface.

8. The sealed battery according to claim 1, wherein the deformation amount of the external terminal at the time of heating is from 1 μm to 10 μm.

9. The sealed battery according to claim 1, wherein the deformation amount of the external terminal is a space between the external terminal and the insulating holder, the space being formed below an outer peripheral edge of the crimping part.

* * * * *